United States Patent [19]

Sikora

[11] 4,086,044

[45] Apr. 25, 1978

[54] APPARATUS FOR THE MEASUREMENT OF THE WALL THICKNESS OF COATED ROD WITH CONSIDERATION OF ECCENTRICITY

[76] Inventor: Harald Sikora, Griesborner Strasse 37, 2800 Bremen, Germany

[21] Appl. No.: 678,620

[22] Filed: Apr. 20, 1976

[30] Foreign Application Priority Data

Apr. 22, 1975 Germany .............................. 2517709

[51] Int. Cl.² .............................................. B29F 3/10
[52] U.S. Cl. ..................................... 425/113; 73/620; 264/40.2; 425/141; 425/169; 425/466
[58] Field of Search ............... 73/67.85, 67.9, DIG. 2; 164/4, 150, 154; 264/40.2, 40.7; 425/113, 114, 140, 141, 145, 3, DIG. 33, 142, 313, 135, 169, 466, 381

[56] References Cited

U.S. PATENT DOCUMENTS

| | | | |
|---|---|---|---|
| 3,128,500 | 4/1964 | Cunningham | 425/313 |
| 3,502,752 | 3/1970 | Brown | 425/113 X |
| 3,914,356 | 10/1975 | Dembiak et al. | 425/140 X |

Primary Examiner—J. Howard Flint, Jr.
Assistant Examiner—Mark Rosenbaum
Attorney, Agent, or Firm—Andrus, Sceales, Starke & Sawall

[57] ABSTRACT

Apparatus for ascertaining the concentricity of the core of an elongated cable with its coating includes a means for establishing a predetermined axial position of the core with respect to the apparatus, as by sensing the intensity of a magnetic field produced by a current induced in the core. With the core in the established position, a second means ascertains the position of the lateral or transverse cross sectional dimension of the cable. Such means may comprise a photoelectric device responsive to the shadow of the cable. Any deviation in the position of the cross sectional dimension results from eccentricity and may be used as an indication of such.

9 Claims, 4 Drawing Figures

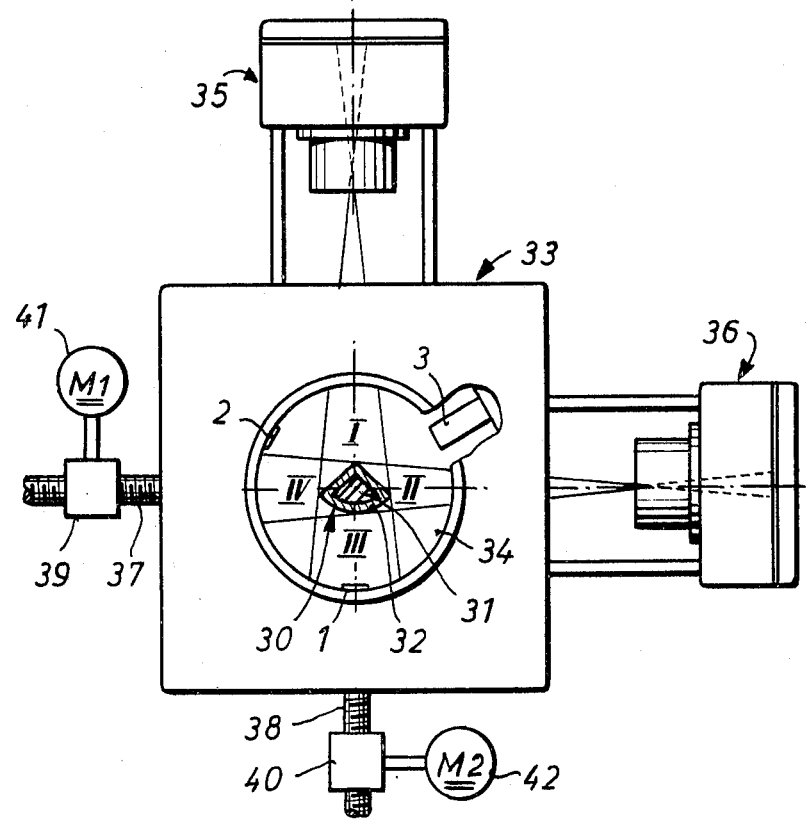
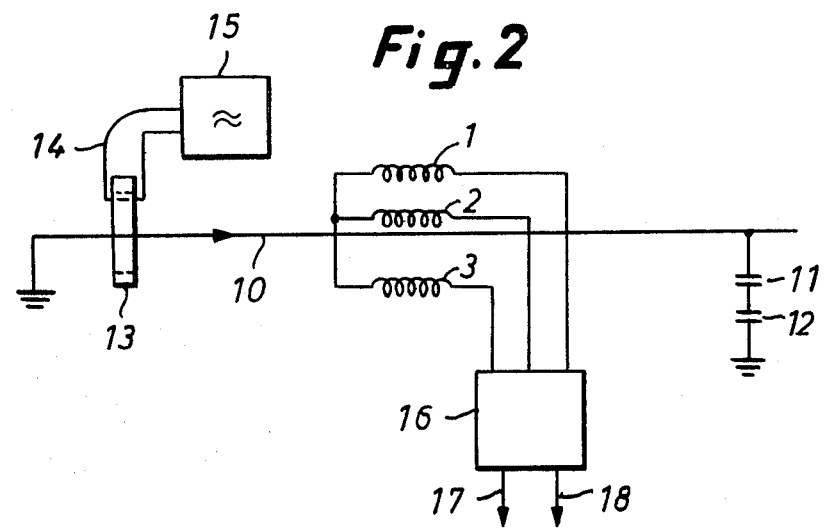

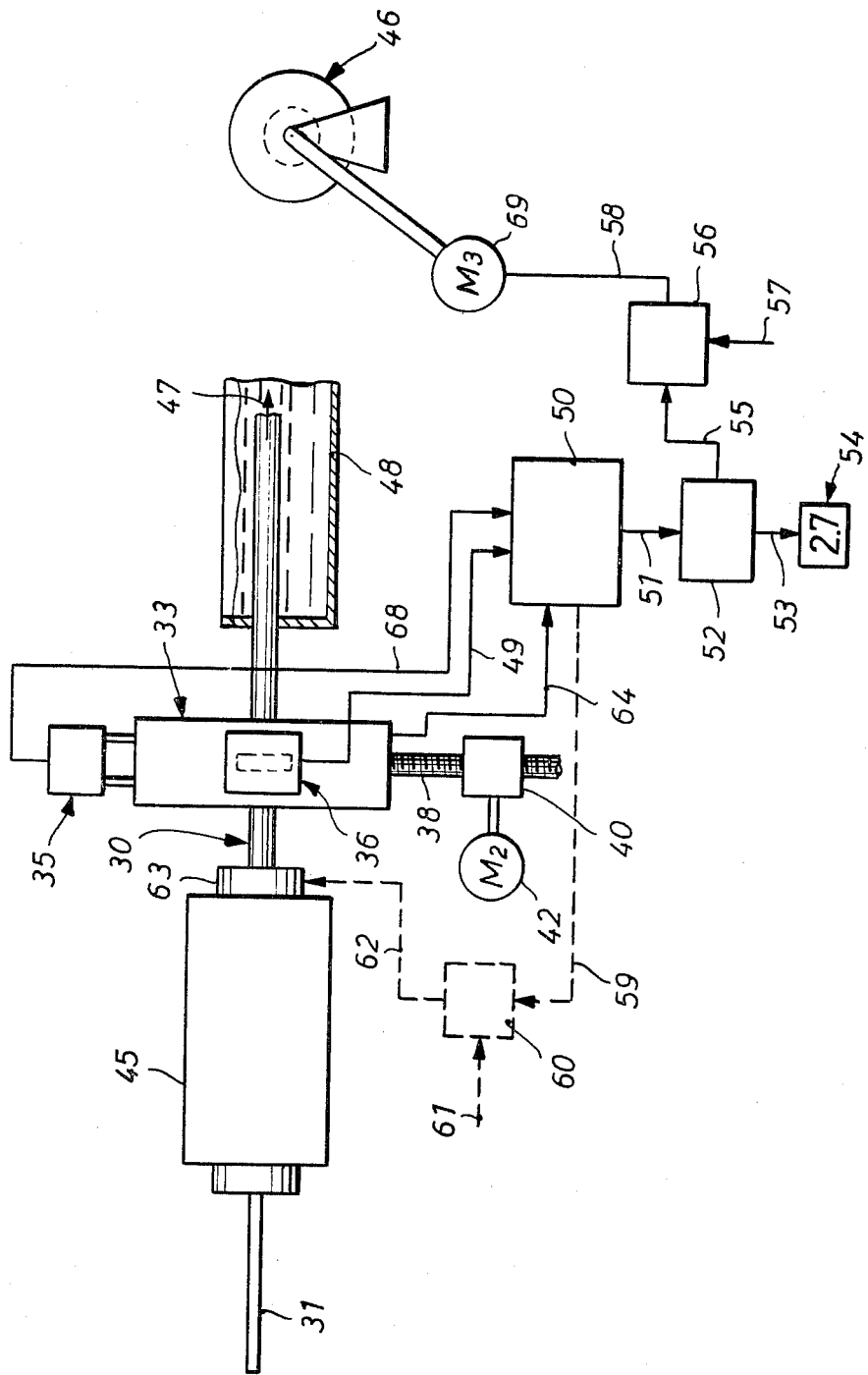

APPARATUS FOR THE MEASUREMENT OF THE WALL THICKNESS OF COATED ROD WITH CONSIDERATION OF ECCENTRICITY

BACKGROUND OF THE INVENTION

1. Field of the Invention

This invention relates to apparatus for the measurement of the wall thickness of a coated rod and for ascertaining the eccentricity of the rod core with respect to the coating.

2. Description of the Prior Art

Electrical conductors are frequently coated with an insulating material. It is important to control the thickness of the coating as it forms a measure of the voltage capacity of the electrical conductor. For this reason, it is essential that the coating be formed concentrically around the conductor. Every eccentricity leads to a reduction of the dielectric strength of the jacket for the conductor.

The invention is obviously not limited to coated rods, but rather to any rod core used for the conduction of current or voltage.

It is known to ascertain the total diameter of a coated rod with a series of measuring apparatuses. These work either through contact or without contact. The former measuring method has a disadvantage when the diameter of the rod is measured immediately beyond the extrusion apparatus where the coating material is proportionately soft. For this reason contactless measuring methods, for example optical measuring methods, are of advantage. Fundamentally, with the use of this measuring process, however, it is not possible to determine or continuously indicate any eccentricity of the rod core with respect to the coating.

SUMMARY OF THE PRESENT INVENTION

It is, therefore, the purpose of the present invention to provide an apparatus for the measurement of the wall thickness of a rod provided with a coating with consideration of the eccentricity of the rod core with reference to the coating and by which the wall thickness and the eccentricity can be continuously measured.

The apparatus according to the invention provides two different measuring apparatuses. The first provides a diameter measuring apparatus which carries out a diameter test that measures the total diameter of the coated rod (the core diameter plus double the wall thickness). For determining the position of the rod core with respect to the coating is further provided a position measuring device which measures the concentric position of the rod core with respect to the diameter measuring apparatus. If the rod core is lead non concentrically with respect to the diameter measuring apparatus an adjusting device controlled with the help of the position measuring signal either changes the condition of the clearance or adjusts the head, which carries the diameter measuring apparatus, in a plane transverse to the rod. By means of such a step the rod core is centered. By means of the diameter measuring apparatus this also permits a variable wall thickness of the coating and thereby to establish the eccentricity of the rod core with reference to the coating.

An exemplary embodiment of the invention provides two diameter measuring apparatus displaced at 90° on the measuring head, whereby the latter with the help of suitable adjustment apparatus can be moved along the two mutually perpendicular axes. In this manner, a correspondingly accurate measurement of the wall thickness of the coating obtained.

The position measurement of the rod core results functionally with the help of a plurality inductive sensors arranged about the rod which measure the magnetic fields that are produced by a current flowing through the rod core. The intensity of the magnetic field is a measure of the radial distance to a conductor. Only when the inductive sensors measure similar intensity values of the magnetic field is the rod core positioned concentrically between the inductive sensors (it is assumed that the inductive sensors are arranged on a circle about the rod).

The diameter measurement signal can be supplied to a regulating device for controlling the speed of the drawing mechanism which moves the rod through the extrusion apparatus in which the rod core is provided with a coating. The diameter measurement signal is compared with a theoretical diameter signal. The resulting difference signal can be used as an output error to the drawing mechanism for the purpose of changing the feed speed of the rod so that the coating is deposited more thickly or thinly dependent on the new speed value.

To avoid errors the invention provides means to interrupt the indication of the diameter value and the regulation of the drawing mechanism if the concentric position of the rod core with respect to the diameter measuring apparatus has changed. When the reestablishment of the concentric position is indicated the resulting correct diameter measuring signal is supplied to the blocking device.

The diameter measuring apparatus works functionally in accordance with optical principles. A light source shines normal to the rod so that the rod forms a dark zone in the receiving plane of receiver apparatus arranged on the opposite lying side of the rod which expension represents a measure for the total diameter of the rod. The position of the dark zone on the receiving plane gives no information about the eccentricity of the insulation, it being presupposed that the rod core has been lead concentrically through the diameter measuring apparatus. The receiving apparatus has functionally a row of separate light receiving elements, for example, photodiodes which may be scanned by a scanning apparatus. The number of the photo diodes without an output signal is a measure of the rod diameter. The position of the photo diodes which lie inside the dark zone is a measure of the eccentricity of the surrounding coating. The eccentricity signal can be applied in various ways to adjust adjustable elements in the extrusion apparatus and correct the eccentricity of the surrounding coating.

BRIEF DESCRIPTION OF THE DRAWING

An exemplary embodiment of the invention is described with the help of the drawings.

FIG. 1 is a schematic side view of an exemplary form of the inventive measuring apparatus.

FIG. 2 shows schematically the construction of the measuring apparatus according to FIG. 1.

FIG. 3 shows another side view of the apparatus according to FIG. 1 and schematically two control circuits.

DETAILED DESCRIPTION OF THE PREFERRED EMBODIMENT

Figure 4:
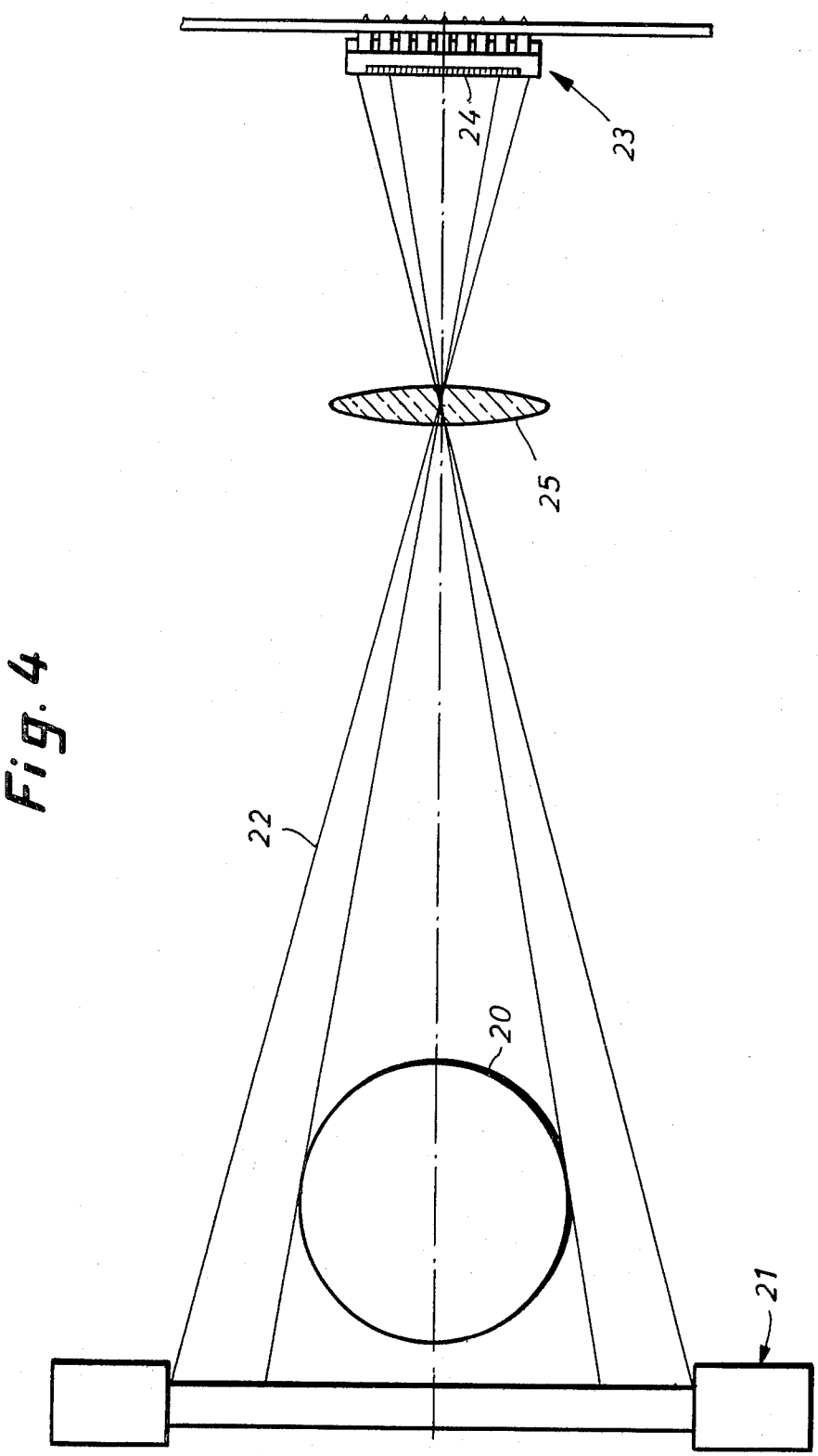
FIG. 4 shows schematically a diameter measuring apparatus.

Reference is initially made to FIG. 2. Therein is shown an equivalent circuit diagram for a coated rod in which rod core 10 is an electrical conductor. The conductor 10 is connected on the left end (in FIG. 2) with earth. At the right hand end there is a connection to earth through the capacitance of the insulating covering which is provided by an extruder (not shown in FIG. 2). The capacitance is represented in FIG. 2 by means of a condensor 11. A second condensor 12 represents the capacitance between a cooling chamber and the surrounding jacket outer surface in which the jacket, after its application is cooled, to provide solidification.

A toroidally formed transformer core 13 is formed around conductor 10 and has at least a single turn of an electrical coil, which is connected to the output of alternating current generator 15. The alternating current generator produces a low or high frequency signal level, for example, with an effective voltage of 20 volts. The annular magnetic alternating field produces a current in conductor 10. The current in the conductor results in an annular magnetic field which induces an alternating current in the three air coils 1, 2, and 3, which are symmetrically arranged in a circle about the circumference of conductor 10. If the conductor 10 is in the middle between the spools 1, 2, and 3 the same voltage is induced in each. A displacement in the direction toward one or another of the air coils leads to a corresponding difference in the induced voltages. The voltage signal of air coils 1 through 3 is provided to an evaluation apparatus 16 which has two outputs 17, 18. A position measuring signal appears in at least one of the outputs 17 and 18 if the conductor 10 is eccentric with respect to the air cores. The inductive sensors operate in the manner of ferrite antennas and, in the alternative, may be replaced by other types of sensors.

In FIG. 4 an exemplary form of a diameter measuring apparatus is shown. A test specimen 20 of circular formed cross section extends perpendicular to the plane of the drawing. An elongated light source 21 lies in a plane parallel to a tangent on the outside of test specimen 20. The light source produces a bundle of rays, identified as 22. Optical receiver apparatus, generally indicated by the numeral 23, forms a receiving plane 24 parallel to the plane of light source 21 and is arranged on the opposite lying side of the test specimen. The measuring plane 24 is formed of a plurality of photodiodes the output of which is scanned by a not disclosed scanning apparatus. Between test specimen 20 and the receiving apparatus 23 an objective lens 25 is arranged.

The test specimen 20 produces in the measuring plane 24 a dark zone, the extension of which is proportional to the diameter of the test specimen. The number of photo diodes which produce no output signal is, therefore, likewise a measure of the test specimen diameter. The position of the dark zone with respect to the measuring plane 24 is a measure of the relative position between the test specimen 20 and the receiving apparatus 23. This is taken advantage of for the measurement of the eccentricity of the surrounding coating of the rod which shall be described further below.

In FIG. 1 a coated rod 30 is shown in a sector form having a sector formed core 31, which is surrounded by a coating 32 preferably having similar wall thickness about the circumference of the core 31. In FIG. 1 is further a measuring head 33 indicated with an opening 34 through which a coated rod 30 is led. The measuring head 33 carries the inductive sensors 1 through 3 shown in FIG. 2. With the measuring head 33 are further two optical receiver apparatuses 35, 36 connected, constructed generally in accordance with FIG. 4. The receiving apparatuses, 35, 36 are arranged at a displacement angle of 90° with respect to each other so that their measuring plane likewise stand normal to each other. The attendant light sources are shown by the representation of FIG. 1.

With the measuring head 33 are further two adjustment spindles 37, 37 connected having their axes again standing at right angles stand to each other. Axially established adjustment nuts 39, 40 coact with adjustment spindles 37 and 38 which can be driven in rotation by the direct current adjustment motors 41 and 42.

By means of the inductive sensors 1 through 3 the position of the rod core 31 with respect to the measuring head 33 can be ascertained at the output 17, 18 of the evaluation device 6 (FIG. 2). The corresponding position measuring signals can be employed to control the adjustment motors or movement means 41, 42 and the measuring head 33 to so move the head that the rod core 31 is arranged concentrically to the opening of the measuring head. The location of the dark zone on the measuring plane of the receiving apparatus 35 and 36 thereby represents a measurement for the eccentricity of the coating about the rod core 31.

The mode of operation of the inventive apparatus can also be explained with the aid of FIG. 3. The initially uncoated sector formed core 31 is coated in the extrusion apparatus 45 with an insulating material so that the coated core 31 is formed which is drawn with the help of a schematically shown drawing mechanism 46 in the direction of the arrow 47. The rod 30 enters in a cooling bath beyond the extrusion apparatus in which a solidification of the coating material is obtained. The measuring head 33 is arranged between the cooling bath 48 and the extrusion apparatus 45.

The drawing apparatus 46 has a direct current driving motor 69 by the variation of which the take up speed and therewith the speed of the rod through the extrusion apparatus 45 can be changed to alter the wall thickness of the applied insulating material.

The receiving apparatus 35 and 36 on the measuring head 33 are connected by conductors 68, 49 with evaluation apparatus 50 which through the conductors 68 and 49 receives not only the measuring value for the total diameter of the rod 30 but also the eccentricity measuring value for the eccentricity of the coating 32 about the rod core 31. The evaluation apparatus 50 has its output connected by conductor 51 to a control and storage circuit 52 which by the conductor 51 receives the diameter measuring signal and ordinarily without more provides same to an optical indicator 54 by conductor 53. The diameter measuring signal is also through conductor 55 provided to a comparison apparatus 56 to which a diameter reference signal is further provided by conductor 57. The difference signal out from the comparison circuit 56 is provided by a conductor 58 to the driving motor 69 for adjusting its speed, so that rod 30 is drawn slower or faster through the extruder apparatus 45.

The evaluation circuit 50 produces also a pair of eccentricity signals (measurement in two directions through the receiving apparatus 35, 36) which by a dotted shown conductor 59 to a further comparison apparatus 60 is provided which also contains a reference signal provided by a conductor 61. The difference signal is by a further dotted shown conductor 62 to an only schematically indicated element 63 of the extrusion apparatus provided. A not disclosed adjustment apparatus for the element 63 adjusts it in accordance with the deviation so that the measured eccentricity is removed.

Evaluation circuit 50 is connected, by conductor 64, with the evaluation circuit 16 of FIG. 2, which is not shown in FIG. 3. As soon as the outputs 16, 17 of the evaluation circuit 16 of FIG. 2 indicate that the rod core 31 is not concentrically led with respect to the measuring head 33 the evaluation circuit interrupts the retransmission of the diameter measurement signals and the eccentricity signals. The storage circuit 52 continues to provide the last correct value in the indicator apparatus 54 and the comparison apparatus 56 for the regulation of the motor 69 until the concentricity of rod 31 with respect to the measuring head 33 is again restored. The inventive measuring apparatus can be applied for all possible techniques of coating rod to measure the diameter and the eccentricity of the coating including, for example, round cable, sector cable, or shielded cables and so on.

Various modes of carrying out the invention are contemplated as being within the scope of the following claims particularly pointing out and distinctly claiming the subject matter which is regarded as the invention.

I claim

1. Apparatus for ascertaining the concentricity of the core of an elongated cable with respect to its coating comprising:
   a measuring head through which such a cable may extend;
   a position measuring device mounted on said head for ascertaining a predetermined axial position of the core of the coated cable with respect to said head; and
   means mounted on said head for establishing a predetermined condition of the lateral dimension of the coated cable with respect to the head indicative of concentricity when the core is in said predetermined position and for sensing deviations in said lateral dimensional condition as an indication of core-coating eccentricity.

2. The apparatus of claim 1 wherein said position measuring device includes control means establishing such a predetermined axial position of the core with respect to said head.

3. The apparatus of claim 2 wherein said control means is further defined as being operatively associated with movement means for said apparatus for moving said apparatus along orthogonal axes lying in a plane perpendicular to the elongation of the cable for establishing the predetermined axial position.

4. The apparatus of claim 2 wherein said position measuring device includes a plurality of inductive sensors arranged about the measuring head for measuring the magnetic field of the core produced by a current flowing therein for providing a signal indicative of the axial position of the core, said control means being responsive to said signal for establishing the predetermined axial position of the core with respect to said head.

5. The apparatus of claim 1 further defined as apparatus for controlling the concentricity of the core with respect to the coating in combination with extruder apparatus applying the coating to the core, said extruder apparatus having an adjustable element which determines the concentricity of the coating and core and, wherein said apparatus for controlling is couplable to said element for controlling its operation in accordance with the sensed deviation in the lateral dimension condition of the coated cable with respect to said head.

6. The apparatus of claim 1 further defined as apparatus for ascertaining the thickness of the coating on the core wherein said means mounted on said head is further defined as means for ascertaining the magnitude of the lateral dimension of the coated cable and for providing said magnitude ascertainment as an indication of coating thickness.

7. The apparatus of claim 6 further defined as apparatus for controlling the thickness of the coating in combination with extruder apparatus having an adjustable element for controlling the thickness of the coating, said apparatus for controlling being couplable to said element for controlling its operation in accordance with the ascertainment of lateral dimension magnitude.

8. The apparatus of claim 2 further defined as apparatus for controlling the thickness of the coating in combination with means for controlling the thickness of the coating applied to the core, wherein said means mounted on said head is further defined as means for ascertaining the magnitude of the lateral dimension of the coated cable and for providing said magnitude ascertainment as an indication of coating thickness, said apparatus for controlling being couplable to said thickness control means for controlling its operation in accordance with the ascertainment of coating thickness magnitude, and wherein said control means of said position measuring device includes means for blocking operation of said thickness control means when the core is not in the predetermined axial position with respect to said head.

9. The apparatus of claim 6 wherein said means mounted on said head further includes read out means for providing a visual read out of coating thickness.

* * * * *